US009981833B2

(12) United States Patent
Carroll

(10) Patent No.: US 9,981,833 B2
(45) Date of Patent: May 29, 2018

(54) BEVERAGE CONTAINER HANDLING AND STORAGE SYSTEM

(71) Applicant: Half Barrel Solutions LLC, West Hartford, CT (US)

(72) Inventor: Michael D. Carroll, West Hartford, CT (US)

(73) Assignee: Half Barrel Solutions, LLC, West Hartford, CT (US)

( * ) Notice: Subject to any disclaimer, the term of this patent is extended or adjusted under 35 U.S.C. 154(b) by 28 days.

(21) Appl. No.: 15/029,880

(22) PCT Filed: Oct. 16, 2014

(86) PCT No.: PCT/US2014/060871
§ 371 (c)(1),
(2) Date: Apr. 15, 2016

(87) PCT Pub. No.: WO2015/057946
PCT Pub. Date: Apr. 23, 2015

(65) Prior Publication Data
US 2016/0272469 A1    Sep. 22, 2016

Related U.S. Application Data

(60) Provisional application No. 61/891,441, filed on Oct. 16, 2013.

(51) Int. Cl.
*B66C 7/02* (2006.01)
*B66C 13/16* (2006.01)
(Continued)

(52) U.S. Cl.
CPC .............. *B66C 17/06* (2013.01); *B66C 7/02* (2013.01); *B66C 13/16* (2013.01); *G01F 22/00* (2013.01);
(Continued)

(58) Field of Classification Search
CPC ........... B66C 7/02; B66C 13/16; B66C 17/00; B66C 17/06; B66C 19/00; G01F 22/00;
(Continued)

(56) References Cited

U.S. PATENT DOCUMENTS 1,696,138 A * 12/1928 Day ........................ A45F 3/20
383/103
6,654,662 B1    11/2003 Hognaland
(Continued)

FOREIGN PATENT DOCUMENTS

| DE | 2811797 A1 * | 9/1979 | ............ B60P 1/5452 |
|----|--------------|--------|-----|
| GB | 2105294 A | 3/1983 | |
| GB | 2215695 A | 9/1989 | |
| GB | 2417476 A * | 3/2006 | ................ B60P 1/54 |
| WO | 9322157 A1 | 11/1993 | |

OTHER PUBLICATIONS

Notification of Transmittal of the International Search Report and the Written Opinion of the International Searfching Authority, or the Declaration; PCT/US2014/060871; dated Feb. 4, 2015; 14 Pages.

*Primary Examiner* — Nguyen Ha
(74) *Attorney, Agent, or Firm* — North Star IP Law PLLC; Edmund P. Anderson

(57) ABSTRACT

A system for handling and storage of beverage containers in a storage space includes a support structure, a hoist motor operably connected to the support structure and movable via the support structure along both a length of the storage space and a width of the storage space, and a lift member operably connected to the hoist motor to secure a first end of a beverage container in an upright position to the hoist motor to lift and move the beverage container from a first location to a second location via operation of the hoist motor and movement of the hoist motor along the support structure.

20 Claims, 6 Drawing Sheets

(51) Int. Cl.
    *B66C 17/00*     (2006.01)
    *B66C 19/00*     (2006.01)
    *B60P 1/54*     (2006.01)
    *G06Q 10/08*     (2012.01)
    *G06Q 50/12*     (2012.01)
    *B66C 17/06*     (2006.01)
    *G06Q 40/00*     (2012.01)
    *G01F 22/00*     (2006.01)
    *G06Q 10/06*     (2012.01)

(52) U.S. Cl.
    CPC ....... *G06Q 10/06395* (2013.01); *G06Q 40/12* (2013.12); *G06Q 50/12* (2013.01)

(58) Field of Classification Search
    CPC .. G06Q 10/06; G06Q 10/06395; G06Q 10/08; G06Q 50/12; B60P 1/54
    See application file for complete search history.

(56) References Cited

U.S. PATENT DOCUMENTS

| | | | |
|---|---|---|---|
| 7,134,831 B2* | 11/2006 | Risser | B60P 1/5442 212/74 |
| 8,277,164 B2* | 10/2012 | Huang | B60P 1/5442 14/73.5 |
| 2004/0060886 A1* | 4/2004 | Windbergs | B66C 9/08 212/179 |
| 2005/0081932 A1 | 4/2005 | Sari et al. | |
| 2008/0122189 A1* | 5/2008 | Foppen | B60P 3/2265 280/1 |
| 2012/0020763 A1* | 1/2012 | Kuramoto | B60P 1/5409 414/539 |
| 2015/0104273 A1* | 4/2015 | Van Kuilenburg | A01K 5/0266 414/21 |

* cited by examiner

BEVERAGE CONTAINER HANDLING AND STORAGE SYSTEM

CROSS REFERENCE TO RELATED APPLICATIONS

This application claims the benefit of International Application No. PCT/US14/060871 filed on Oct. 16, 2014 and U.S. Provisional Application No. 61/891,441 filed on Oct. 16, 2013.

BACKGROUND

The subject matter disclosed herein relates to handling and storage of beverage containers.

Establishments such as restaurants, bars, or other locations where beverages are handled or sold, such as stadiums, arenas, theatres and the like, often sell beverages such as soft drinks and beer dispensed from large containers, often referred to as "kegs", through pressurized tubing and out through a dispenser into a glass or other container. The containers or kegs are typically stored in a location or room remotely situated relative to the dispenser, for example, a walk-in cooler or storage room. There the containers are connected to the tubing, which conveys the product from the storage room to the dispenser. When a container or keg is emptied, it is disconnected from the tubing and is replaced with a full container of the same or different product, which is connected to the tubing. This exchange is typically done by hand, with a person required to move the empty container or keg from its location and move a full container or keg, often weighing over 100 pounds, into position to be connected to the tubing. Such lifting and movement of the containers or kegs in often cramped or poorly lit storage rooms often leads to workplace injuries.

SUMMARY

In one embodiment, a system for handling and storage of beverage containers in a storage space includes a support structure, a hoist motor operably connected to the support structure and movable via the support structure along both a length of the storage space and a width of the storage space, and a lift member operably connected to the hoist motor to secure a first end of a beverage container in an upright position to the hoist motor to lift and move the beverage container from a first location to a second location via operation of the hoist motor and movement of the hoist motor along the support structure.

Additionally or alternatively, in this or other embodiments the support structure includes a bridge assembly disposed substantially horizontally in the storage space and fixed therein, a cross member assembly operably connected to the bridge assembly and movable along a length of the bridge assembly, and a motor support assembly operably connected to the cross member assembly and movable along a length of the cross member assembly, the hoist motor secured to the motor support assembly.

Additionally or alternatively, in this or other embodiments the bridge assembly includes two or more bridge members extending along a length of the storage space.

Additionally or alternatively, in this or other embodiments the cross member assembly is connected to the bridge assembly by one or more trolley assemblies.

Additionally or alternatively, in this or other embodiments each trolley assembly of the one or more trolley assemblies includes two or more trolleys spaced apart along a length of the trolley assembly.

Additionally or alternatively, in this or other embodiments the one cross member assembly includes two or more cross members extending along a width of the storage space.

Additionally or alternatively, in this or other embodiments the motor support assembly is connected to the cross member assembly via one or more motor support trolleys.

Additionally or alternatively, in this or other embodiments a frame is supportive of the system and a floor is connected to the frame. The floor, frame and handling system are configured for removable installation in a compartment of a vehicle.

Additionally or alternatively, in this or other embodiments the floor includes one or more features receptive of lift arms for loading into and/or unloading of the system from the compartment.

Additionally or alternatively, in this or other embodiments a secondary bridge member is connected to the bridge assembly via a secondary trolley and the hoist motor is connected to the secondary bridge member, thereby extending a range of motion of the hoist motor.

Additionally or alternatively, in this or other embodiments a scale is operably connected to the lift member to provide a measured weight of the beverage container.

Additionally or alternatively, in this or other embodiments the measured weight is utilized to determine a volume of beverage dispensed and compared to beverage sales records to determine a volume of beverage waste or spillage.

Additionally or alternatively, in this or other embodiments the storage room includes a refrigeration unit to cool the storage room.

Additionally or alternatively, in this or other embodiments at least one beverage container is connected to a remotely located beverage dispenser via a valve and tubing arrangement extending from the beverage dispenser into the storage room.

In another embodiment, a method of moving a beverage container from a first location to a second location in a storage room includes traversing a hoist motor along a length and/or a width of a support structure supporting the hoist motor, moving the hoist motor to a position above a beverage container at the first location, connecting a first end of the beverage container to the hoist motor via a lift member, lifting the beverage container to a selected height via the hoist motor, moving the beverage container to the second location by traversing the hoist motor along a length and/or width of the support structure, and disconnecting the beverage container from the lift member.

Additionally or alternatively, in this or other embodiments traversing the hoist motor along the length and/or the width of the support structure includes traversing the hoist motor along a length of a cross member assembly, and traversing the cross member assembly along a length of a bridge assembly. The cross member assembly is positioned substantially perpendicular to the bridge assembly.

Additionally or alternatively, in this or other embodiments a valve and tubing arrangement is disconnected from the beverage container before moving the beverage container to the second location. The valve and tubing arrangement extends from the storage space to a dispenser disposed remotely from the second location.

Additionally or alternatively, in this or other embodiments the hoist motor is moved along the length and/or width of the storage room via a trolley assembly.

Additionally or alternatively, in this or other embodiments connecting the first end of the beverage container to the hoist motor via a lift member includes securing a closed loop strap to the hoist motor and to one or more openings in the first end of the beverage container.

Additionally or alternatively, in this or other embodiments the beverage container is weighed via a scale operably connected to the lift member.

Additionally or alternatively, in this or other embodiments the measured weight is compared to a baseline weight to determine a volume of beverage dispensed from the beverage container.

Additionally or alternatively, in this or other embodiments the volume of beverage dispensed is compared to beverage sales records to determine a volume of beverage waste or spillage.

These and other advantages and features will become more apparent from the following description taken in conjunction with the drawings.

BRIEF DESCRIPTION OF THE DRAWINGS

The subject matter described herein is particularly pointed out and distinctly claimed in the claims at the conclusion of the specification. The foregoing and other features, and advantages of the present disclosure are apparent from the following detailed description taken in conjunction with the accompanying drawings in which:

The detailed description explains embodiments of the present disclosure, together with advantages and features, by way of example with reference to the drawings.

DETAILED DESCRIPTION

Figure 1:
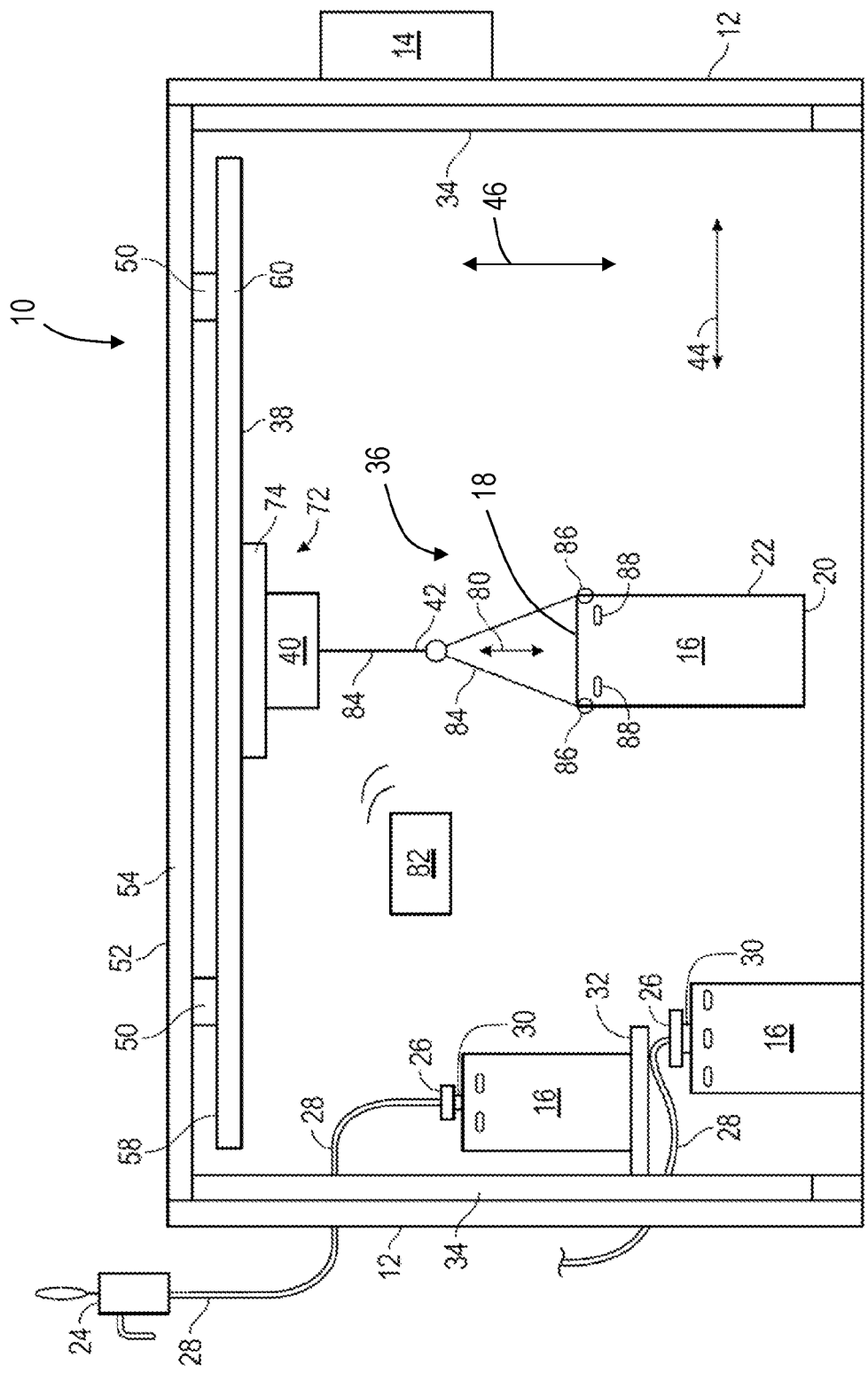
FIG. 1 is a schematic elevation view of an embodiment of a storage space for beverage containers including a handling system.

Shown in FIG. 1 is a schematic elevation view of an exemplary beverage container storage room 10. The storage room 10 may be enclosed by one or more walls 12, and in some embodiments is temperature-controlled via, for example, an air conditioning or refrigeration system 14. It is to be appreciated, that while the present disclosure is presented with reference to a storage room 10, the storage room 10 is merely an exemplary location for the structure of the present disclosure. The structures disclosed herein may be utilized in other spaces, such as a truck or other vehicle, a warehouse, a stadium, an arena, or the like. Further, the location may be a free-standing cooler or cooler room which may have components of the disclosed system formed or built or otherwise assembled or installed into the structure of the cooler.

A number of beverage containers 16, for example, kegs, barrels, or the like, are stored in the storage room 10. The beverage containers 16 are substantially cylindrical, having a first end 18, a second end 20 and a side wall portion 22 extending between the first end 18 and the second end 20. At least some of the beverage containers 16 are connected to dispensers 24, such as taps, located, in some embodiments, outside of the storage room 10. The beverage containers 16 are connected to the dispensers 24 via a valve 26 and tubing 28 arrangement which is connected to a container opening 30 at the first end 18 and conveys a flow of beverage from the beverage container 16 to the dispenser 24. In some embodiments, some or all of the beverage containers 16 are located on shelves 32. In some embodiments, the shelves 32 are secured to the wall 12 and/or a brace 34 extending along the wall 12. The shelves 32 may extend from the wall 12 and/or the brace 34 in a cantilevered manner. In some embodiments, the shelves 32 may be adjustable in height, or alternatively hinged so that they may be stowed against the wall 12 or the brace 34 when not in use. The beverage containers 16 may contain, for example, beer, wine, soft drinks, or ingredients therefore, such as syrup to be mixed with carbonated water for a soft drink.

From time to time, for example, weekly, daily, or even multiple times per day, it is desired to exchange beverage containers 16 connected to dispensers 24, for example, when a first beverage container 16 is emptied, it is desired to replace it with a full beverage container 16. To do so, a handling system 36 is located in the storage room 10. The handling system 36 includes a support structure 38, a hoist motor 40 connected to the support structure 38, and a lift member 42 to attach a beverage container 16 to the handling system 36 and to convey the beverage container 16 from a first location in the storage room 10 to a second location in the storage room 10. Movement of the beverage container 16 via the handling system 36 may be across a storage room width 44, along a storage room height 46, and/or along a storage room length 48 (shown in FIG. 2).

Figure 2:
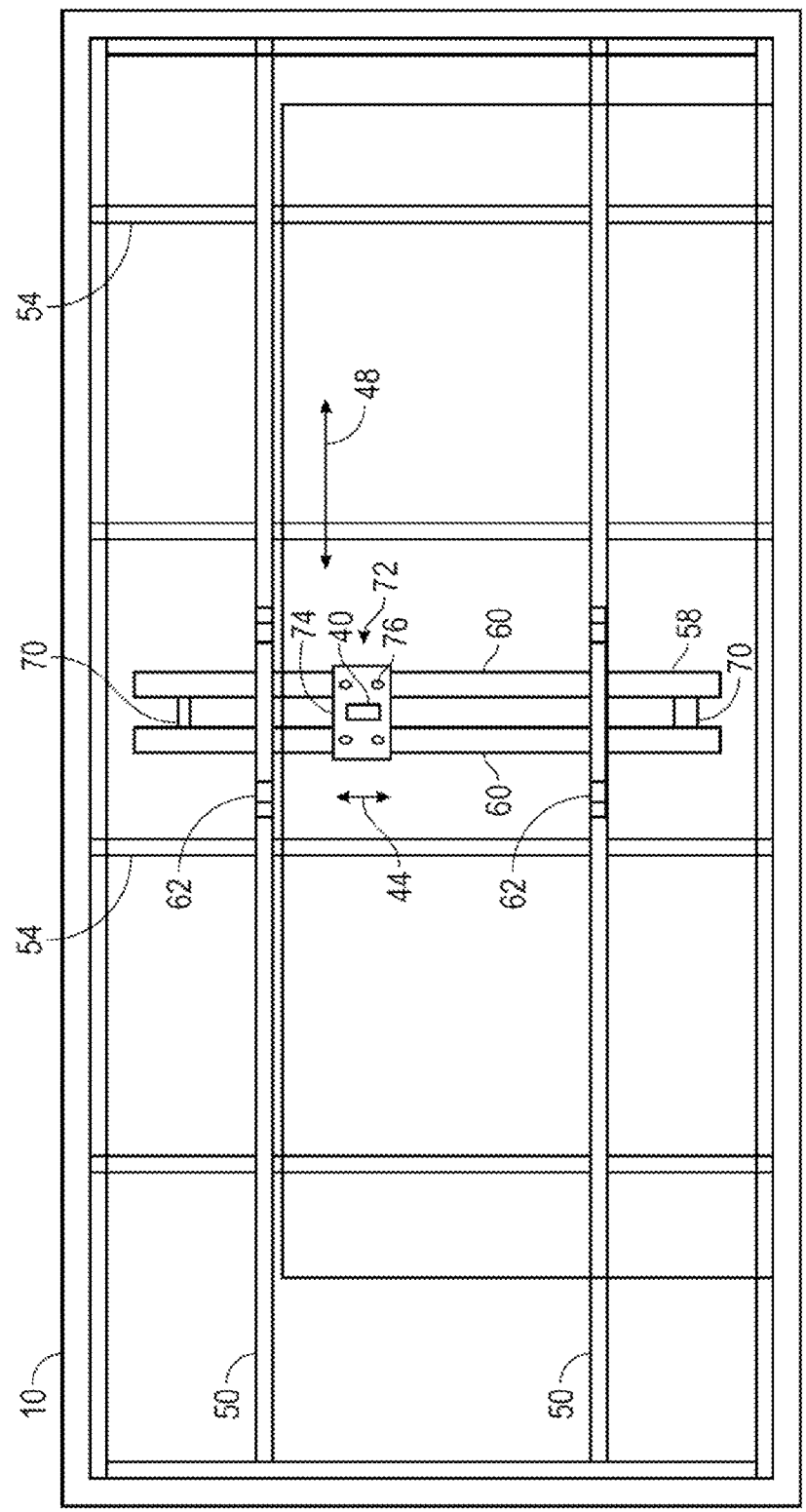
FIG. 2 is a schematic plan view of an embodiment of a storage space for beverage containers including a handling system.

In one embodiment, the support structure 38 includes one or more bridge members 50 secured to a ceiling 52 of the storage room 10 via a plurality of frame members 54. The bridge members 50 extend substantially horizontally along the storage room length 48. While in the embodiment shown in FIG. 1, the bridge members 50 are secured to the ceiling 52 via the frame members 54, in other embodiments the bridge members 50 may be secured directly to the ceiling 52. The bridge members 50 may further be supported by the braces 34 extending from the bridge members 50 to a floor 56 of the storage room 10. The bridge members 50 are, for example, unistrut members or C-channel members formed from material suitable to support the required loads, for example, a steel material. In some embodiments, as shown in FIG. 2, the bridge members 50 extend the entire storage room length 48, while in other embodiments the bridge members 50 extend only partially along the storage room length 48. Referring again to FIG. 1, the frame members 54 extend perpendicular to the bridge members 50. While the embodiment of FIG. 1 includes two bridge members 50, in other embodiments one bridge member 50 or three or more bridge members 50 may be utilized.

Figure 3:
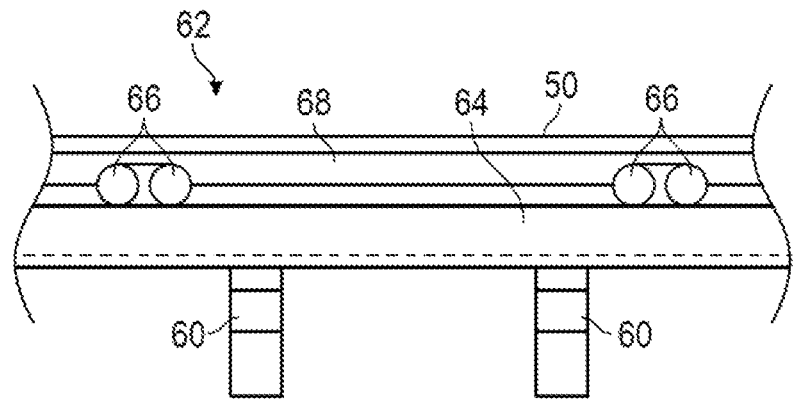
FIG. 3 is a schematic cross-sectional view of an embodiment of a trolley assembly.

The support structure 38 further includes a cross member assembly 58 shown best in FIG. 2. The cross member assembly 58 includes two or more cross members 60 extending across the storage room width 44. The cross members 60 extend perpendicular to the bridge members 50. In some embodiments, one or more cross member supports 70 extend between the cross members 60 to add rigidity to the cross member assembly 58. The cross members 60 are connected to the bridge members 50 via two or more trolley assemblies 62. Referring now to FIG. 3, each trolley assembly 62 includes a trolley support 64 affixed to the cross members 60. In some embodiments the trolley support 64 is a plate, for example, about 18 inches in length, but other elements may be utilized as a trolley support 64. Such trolley support length is advantageous as it stabilizes the trolley assembly 62, preventing racking or jamming of the trolley assembly 62 in the bridge member 50. Two pairs of rollers 66 are secured to the trolley support 64 and are installed into a bridge member channel 68 of each bridge member 50. The rollers 66 are slidable and/or rollable along the bridge member channel 68 so the cross member assembly 58 is movable along the storage room length 48 via movement along the bridge members 50, as shown in FIG. 2.

Figure 4:
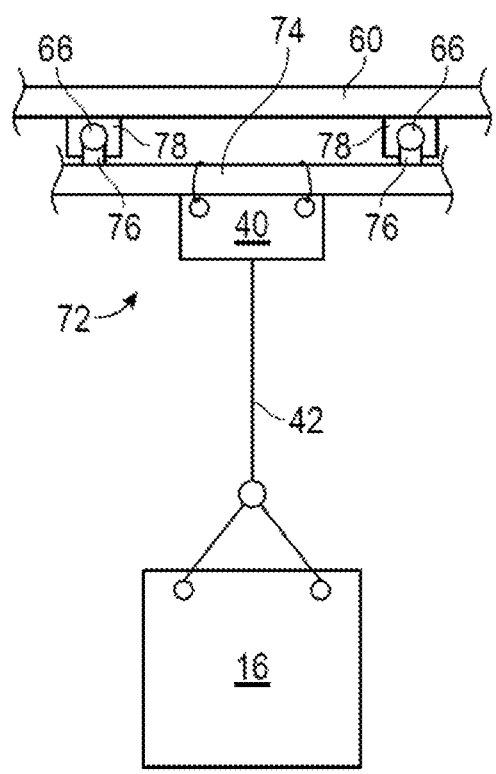
FIG. 4 is a schematic cross-sectional view of an embodiment of a motor support assembly.

As shown in FIG. 2, the hoist motor 40 is connected to the cross member assembly 58 via a motor support assembly 72. The motor support assembly 72 includes a motor support plate 74 to which the hoist motor 40 is secured. The motor support plate 74 spans the cross member assembly 58 and is connected to each cross member 60 via a motor support trolley 76, as best shown in FIG. 4. Each motor support trolley 76 includes at least one roller 66 installed into a cross member channel 78 of the cross member 60. The motor support assembly 72 and thus the hoist motor 40 are movable along the cross member assembly 58 across the storage room width 44 via the sliding and/or rolling of the rollers 66 along the cross member channel 78.

Referring now to FIG. 1, the hoist motor 40 is secured to the motor support plate 74 by, for example, a plurality of mechanical fasteners, such as bolts (not shown). The hoist motor 40 is, for example, an electric motor operable to raise and lower the lift member 42 along a hoist axis 80, and is operable via a controller 82, having a wired or wireless connection to the hoist motor 40. The lift member 42 is, for example, a cable, a chain, or a nylon strap adapted for securing to the beverage container 16 for lifting of the beverage container 16.

Figure 5:
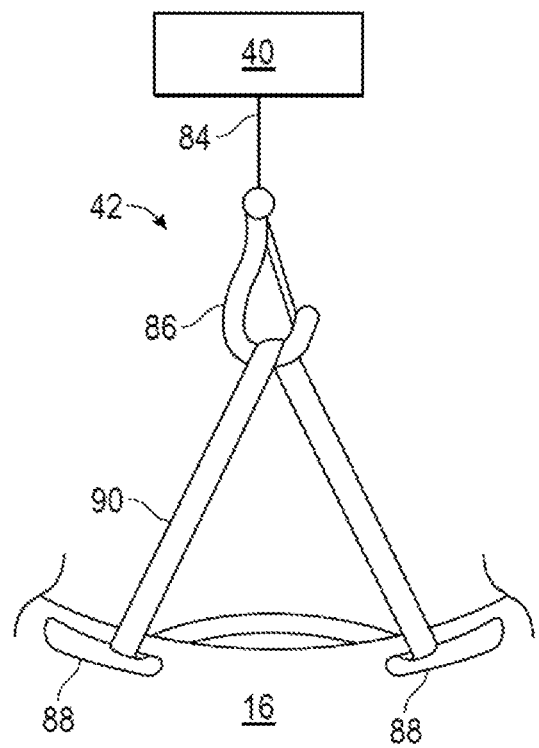
FIG. 5 is a schematic view of an embodiment of a strap arrangement.
Figure 6:
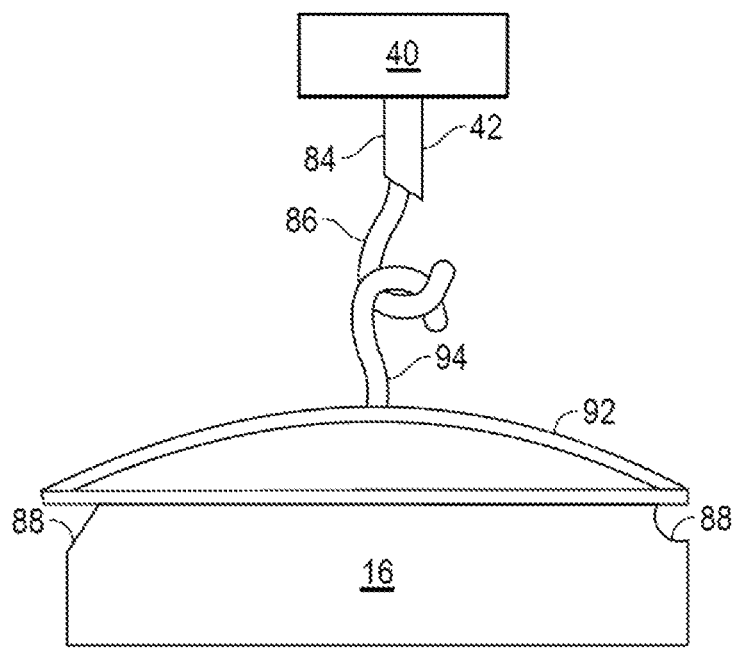
FIG. 6 is a schematic view of another embodiment of a strap arrangement.

Referring again to FIG. 1, the lift member 42 may include lift cables 84 and a plurality of eye hooks 86 securable to the beverage container 16 at a rim opening 88 located at the first end 18 or other location on the beverage container 16. In another embodiment, as shown in FIG. 5, the lift member 42 includes a lift cable 84 extending from the hoist motor 40, with an eye hook 86 at the end of the lift cable 84. A closed loop strap 90 is routed through rim openings 88 of the beverage container 16 and over the eye hook 86 to secure the beverage container 16 to the hoist motor 40. In still another embodiment, as shown in FIG. 6, a lift plate 92 extends through the rim openings 88, and includes an eyelet 94 to which the eye hook 86 of the lift cable 84 is connected. The handling system 36 (see FIG. 1) lifts the beverage container 16 via the first end 18 so that the beverage container 16 remains in an upright orientation when moved, allowing for easy access to the container opening 30 at the first end 18 for connecting of the valve 26.

Figure 7:
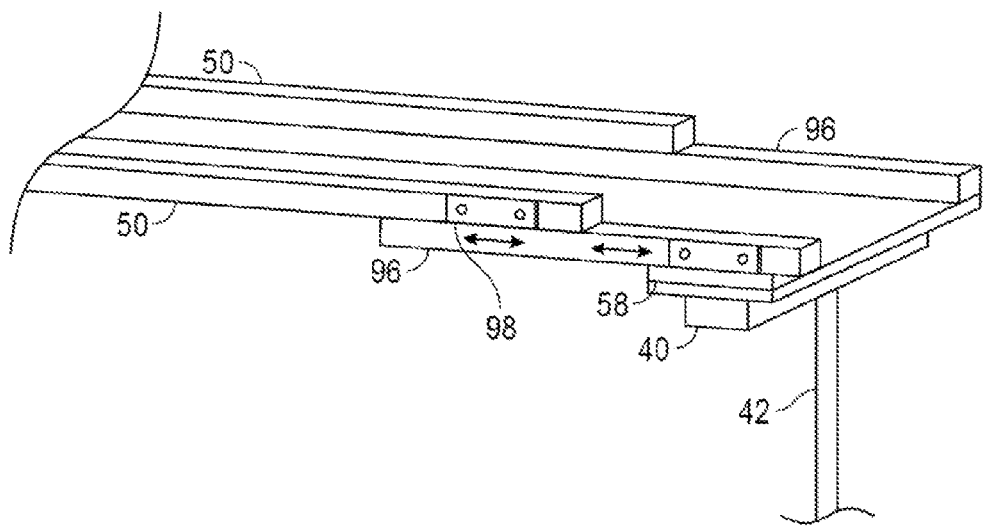
FIG. 7 is a schematic view of an embodiment of a bridge extension

In another embodiment, referring now to FIG. 7, a secondary bridge member 96 is secured to the bridge member 50 via a secondary trolley 98 with the cross member assembly 58 connected to the secondary bridge member 96. The secondary bridge member 96 is parallel to the bridge member 50 and the secondary trolley 98 allows the secondary bridge member 96 to extend beyond an extent of the bridge member 50, and thus the hoist motor 40 may be positioned beyond an extent of the bridge member 50 in, in one example, a quasi-cantilevered position as shown in FIG. 7. This arrangement is particularly advantageous for extending a range of movement for the beverage container 16, such as when moving the beverage container 16 from a first space, such as a delivery truck, to a second space, such as a storage space.

Figure 8:
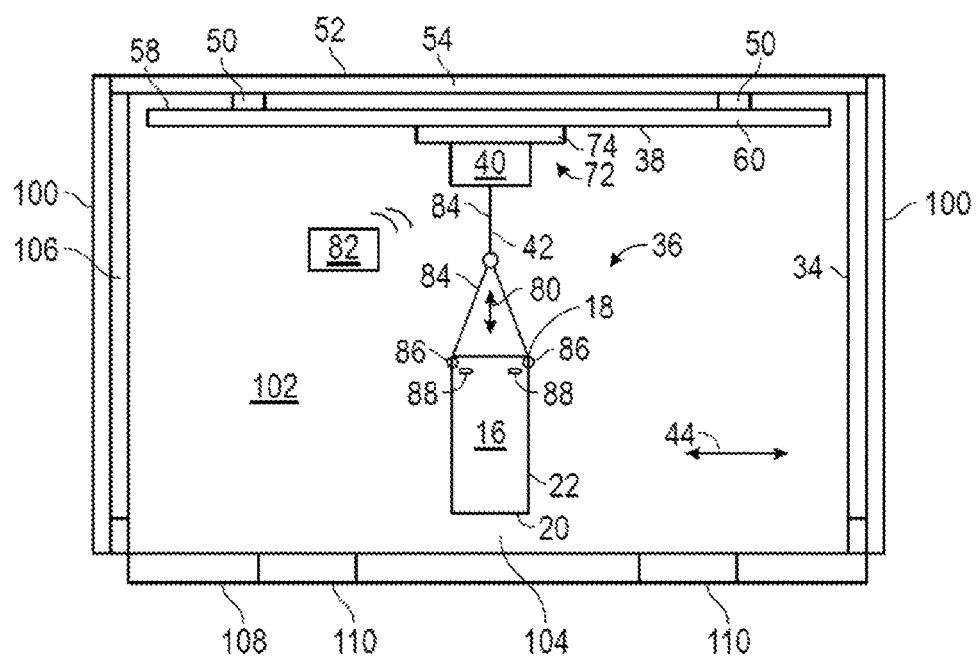
FIG. 8 is an elevation view of an embodiment of a handling system for a vehicle.

Referring now to FIG. 8, an embodiment of a handling system 36 configured for installation in a vehicle, such as a truck 100 is shown. The truck 100 has a compartment 102 for storage and/or transportation of beverage containers 16, accessible via a truck opening 104. In this embodiment, the handling system 36 is connected to and supported by a frame 106. The frame 106 includes support structure 38 and a floor 108 connected to the support structure 38. The handling system 36 and frame 106 are configured such that they may be loaded into and unloaded from the compartment 102 via use of, for example a fork lift or other such device. To stabilize the frame 106, especially during loading or unloading operations, one or more cross-braces (not shown) extending between members of the frame 106 may be utilized. In some embodiments, the floor 108 includes slots or other openings 110 to accept fork lift arms (not shown) to allow the frame 106 and handling system 36 to be loaded into and/or unloaded from the compartment 102 without damage to the frame 106 or handling system 36. Beverage containers 16 may be positioned on the floor 108 either before or after loading the handling system 36 into the compartment 102. The frame 106 may be customized to fit the selected compartment 102. In one embodiment, the frame 106 has a height of about 84 inches, a width of about 48 inches and a depth of about 39 inches. It is to be appreciated that this size is merely exemplary and that the frame 106 may be of any selected size to fit the selected compartment 102.

Locating the handling system 36 in the compartment 102 of the truck 100 allows for unloading of the compartment 102 at remote locations, such as restaurants and the like via the handling system 36, thus increasing worker safety and preventing injury and the associated costs. Further, the frame 106 and handling system 36 are easily removable from the compartment 102, should the compartment be utilized for transporting other items, or if it is not desired to utilize the handling system 36.

Operation of the system will be described below with reference to, for example, FIGS. 1 and 2. When it is desired or necessary to relocate beverage containers 16 in the storage room 10, such as when a first beverage container 16 is empty, the first beverage container 16 at a first location is first disconnected from the dispensers 24 by disconnecting the valve 26 and tubing 28 from the beverage container 16. The hoist motor 40 is then conveyed along the cross member assembly 58 via the motor support trolleys 76, and/or the cross member assembly 58 is conveyed along the bridge members 50 via the trolley assemblies 62 into a position above the first beverage container 16. The first beverage container 16 is then secured to the hoist motor 40 via the lift member 42, and the hoist motor 40 is activated to lift the first beverage container 16 to a selected height. The first beverage container 16 is then conveyed along the cross member assembly 58 via the motor support trolleys 76, and/or the cross member assembly 58 is conveyed along the bridge members 50 via the trolley assemblies 62 to a selected second location. The hoist motor 40 is then utilized to lower the first beverage container 16 to the floor 56 or alternatively a shelf 32. A replacement beverage container 16 may then be moved by the same procedure to the vacated first location and connected to the dispenser 24 via the valve 26 and tubing 28 arrangement.

Figure 9:
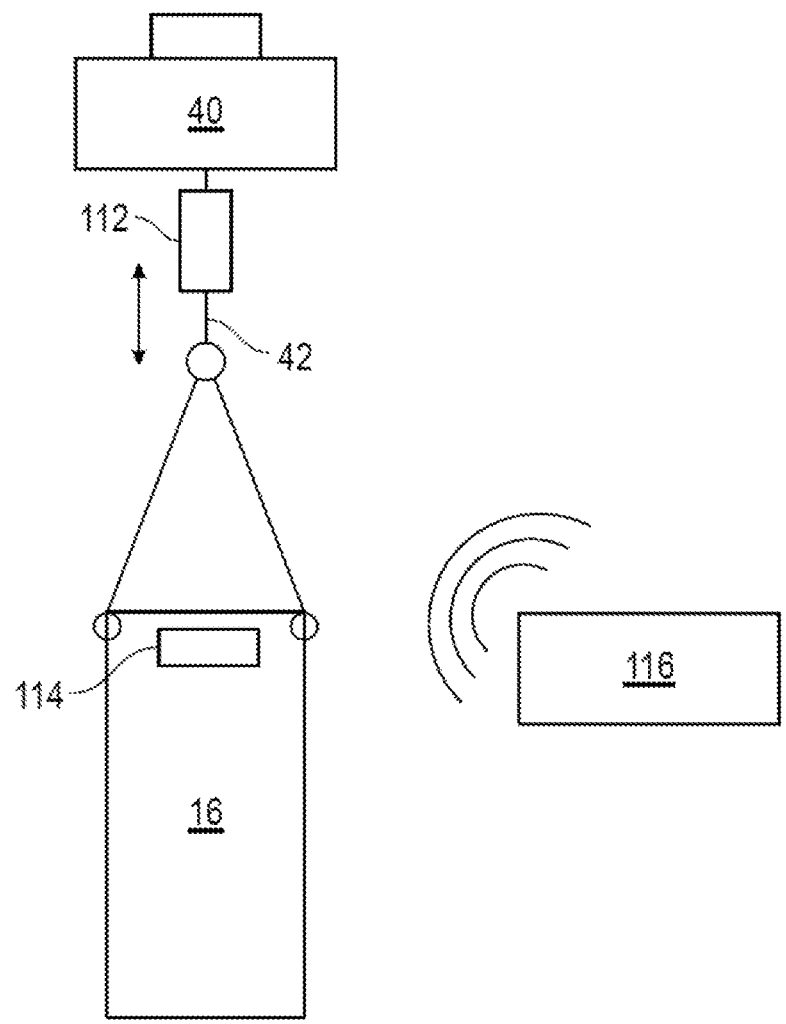
FIG. 9 is a schematic view of another embodiment of a handling system for beverage containers.

Referring now to FIG. 9, in some embodiments the system includes a scale 112 at the lift member 42. In some embodiments, the scale 112 is a battery-operated electronic scale. The scale 112 may be utilized for, for example, inventory measurements. The beverage container 16 will have a weight that coincides with a volume of beverage inside the beverage container 16. A measured weight is compared to a starting or baseline weight to determine a dispensed volume of beverage from the beverage container 16. This dispensed volume can then be compared to a sold volume of the beverage known from, for example, sales records. In some embodiments, each beverage container has a unique identifier, such as a bar code 114, to which the measured weight is linked. In some embodiments, the link and the comparison is accomplished via a computer system 116, connected to the system via a wired or a wireless connection. Differences between the dispensed volume and sales volume may be attributed to, for example, waste or spillage, and the user can implement measures to reduce such waste or spillage. Reducing the difference between the sales volume and dispensed volume is advantageous to increase the profit potential for the user.

Utilizing the system described herein to move and store beverage containers 16 in the storage room 10, allows for enhanced ease of movement of the beverage containers 16 and reduces the potential for workplace injuries associated with prior methods for moving the beverage containers 16. Further, when the system includes the scale 112, the system allows for improved inventory tracking and management, improving profit potential.

While the present disclosure has been described in detail in connection with only a limited number of embodiments, it should be readily understood that the present disclosure is not limited to such disclosed embodiments. Rather, the embodiments described herein can be modified to incorporate any number of variations, alterations, substitutions or equivalent arrangements not heretofore described, but which are commensurate with the spirit and scope of the present disclosure. Additionally, while various embodiments of the disclosure have been described, it is to be understood that aspects of the disclosure may include only some of the described embodiments. Accordingly, the present disclosure is not to be seen as limited by the foregoing description, but is only limited by the scope of the appended claims.

What is claimed is:

1. A beverage container storage and handling system for a storage space having a ceiling, comprising:
   a support structure configured for attachment to the ceiling, comprising:
   a bridge assembly configured to be disposed substantially horizontally in the storage space and fixed to the ceiling therein, the bridge assembly comprising a plurality of spaced apart bridge members extending along a length of the storage space;
   a cross member assembly comprising a plurality of spaced apart cross members extending along a width of the storage space perpendicular to the bridge members, the cross member assembly configured to be operably connected to the bridge assembly and movable along a length of the bridge assembly; and
   a motor support assembly that is configured to be operably connected to the cross members of the cross member assembly and movable along a length of the cross member assembly;
   a hoist motor configured to be secured to the motor support assembly and operably connected to the support structure and movable via the support structure along both the length of the storage space and the width of the storage space; and
   a lift member configured to be operably connected to the hoist motor to secure a first end of a beverage container in an upright position to the hoist motor to lift and move the beverage container from a first location to a second location via operation of the hoist motor and movement of the hoist motor along the support structure.

2. The system of claim 1, wherein the bridge assembly includes more than two bridge members extending along a length of the storage space.

3. The system of claim 1, wherein the cross member assembly is operably connected to the bridge assembly by one or more trolley assemblies.

4. The system of claim 3, wherein each trolley assembly of the one or more trolley assemblies includes two or more trolleys spaced apart along a length of the trolley assembly.

5. The system of claim 1, wherein the cross member assembly includes more than two cross members extending along a width of the storage space.

6. The system of claim 1, wherein the motor support assembly is operably connected to the cross member assembly via one or more motor support trolleys.

7. The system of claim 1, further comprising a secondary bridge member connected to the bridge assembly via a secondary trolley, the motor support assembly and hoist motor connected to the secondary bridge member, thereby extending a range of motion of the hoist motor.

8. The system of a claim 1, further comprising a scale operably connected to the lift member to provide a measured weight of the beverage container.

9. The system of claim 8, wherein the measured weight is utilized to determine a volume of beverage dispensed and compared to beverage sales records to determine a volume of beverage waste or spillage.

10. The system of claim 1, wherein the storage space includes a refrigeration unit to cool the storage room.

11. The system of claim 1, wherein at least one beverage container is connected to a remotely located beverage dispenser via a valve and tubing arrangement extending from the beverage dispenser into the storage space.

12. A method of moving a beverage container from a first location to a second location in a storage space having a ceiling using a beverage container storage and handling system comprising: a support structure attached to the ceiling, the support structure comprising: a bridge assembly disposed substantially horizontally in the storage space and fixed to the ceiling therein, the bridge assembly comprising a plurality of spaced apart bridge members extending along a length of the storage space, a cross member assembly comprising a plurality of spaced apart cross members extending along a width of the storage space perpendicular to the bridge members, the cross member assembly operably connected to the bridge assembly and movable along a length of the bridge assembly, and a motor support assembly that is operably connected to the cross members of the cross member assembly and movable along a length of the cross member assembly; a hoist motor secured to the motor support assembly and operably connected to the support structure and movable via the support structure along both the length of the storage space and the width of the storage space; and a lift member operably connected to the hoist motor, the method comprising:
   traversing the hoist motor along the length and/or the width of the support structure;

moving the hoist motor to a position above a beverage container at the first location;

connecting a first end of the beverage container to the hoist motor via the lift member;

lifting the beverage container to a selected height via the hoist motor;

moving the beverage container to the second location by traversing the hoist motor along a length and/or width of the support structure; and disconnecting the beverage container from the lift member.

13. The method of claim 12, wherein traversing the hoist motor along the length and/or the width of the support structure includes:

traversing the hoist motor along the length of the cross member assembly; and traversing the cross member assembly along the length of the bridge assembly.

14. The method of claim 12, further comprising disconnecting a valve and tubing arrangement from the beverage container before moving the beverage container to the second location, the valve and tubing arrangement extending from the storage space to a dispenser disposed remotely from the second location.

15. The method of claim 12, wherein the hoist motor is moved along the length and/or width of the storage room via a trolley assembly.

16. The method of claim 12, wherein connecting the first end of the beverage container to the hoist motor via a lift member includes securing a closed loop strap to the hoist motor and to one or more openings in the first end of the beverage container.

17. The method of claim 12, further comprising weighing the beverage container via a scale operably connected to the lift member.

18. The method of claim 17, further comprising comparing the measured weight to a baseline weight to determine a volume of beverage dispensed from the beverage container.

19. The method of claim 18, further comprising comparing the volume of beverage dispensed to beverage sales records to determine a volume of beverage waste or spillage.

20. A beverage container storage and handling system for a storage space having a ceiling, comprising:

a support structure configured for attachment to the ceiling, comprising:

a bridge assembly configured to be fixed to the ceiling, the bridge assembly comprising a plurality of spaced apart bridge members extending along a length of the storage space, each bridge member comprising a bridge member channel;

a cross member assembly, the cross member assembly comprising a plurality of spaced apart cross members extending across a width of the storage space perpendicular to the bridge members, each cross member comprising a cross member channel, the cross member assembly configured to be operably connected to each bridge member of the bridge assembly by a cross member trolley assembly comprising a trolley support that extends along the bridge members and is fixed to each of the cross members and a plurality of spaced apart rollers rollably disposed on the trolley support, the rollers configured to be disposed in the bridge member channel of the corresponding bridge member, the cross member assembly configured to be movable along the bridge members along the length of the storage space, and a motor support assembly, the motor support assembly comprising a motor support plate that spans the cross member assembly, the motor support plate configured to be operably connected to each cross member by a plurality of spaced apart motor support trolleys comprising a plurality of rollers rollably disposed on the motor support plate, the rollers configured to be rollably disposed in the cross member channel of the corresponding cross member, the motor support assembly configured to be movable along a length of the cross member assembly across the width of the storage space;

a hoist motor configured to be secured to the motor support assembly and operably connected to the support structure and movable via the support structure along both the length of the storage space and the width of the storage space; and a lift member configured to be operably connected to the hoist motor to secure a first end of a beverage container in an upright position to the hoist motor to lift and move the beverage container from a first location to a second location via operation of the hoist motor and movement of the hoist motor along the support structure.

* * * * *